United States Patent
Seo et al.

(10) Patent No.: US 10,647,894 B2
(45) Date of Patent: May 12, 2020

(54) ADHESIVE COMPOSITION FOR OPTICAL USE AND ADHESIVE LAYER FOR OPTICAL USE COMPRISING CURED PRODUCT THEREOF

(71) Applicant: LG Chem, Ltd., Seoul (KR)

(72) Inventors: Kwang Su Seo, Daejeon (KR); Eun Kyung Park, Daejeon (KR); Seung Won Lee, Daejeon (KR); Jang Soon Kim, Daejeon (KR); Tae Yi Choi, Daejeon (KR)

(73) Assignee: LG Chem, Ltd. (KR)

( * ) Notice: Subject to any disclaimer, the term of this patent is extended or adjusted under 35 U.S.C. 154(b) by 48 days.

(21) Appl. No.: 16/094,663

(22) PCT Filed: Apr. 4, 2017

(86) PCT No.: PCT/KR2017/003706
§ 371 (c)(1),
(2) Date: Oct. 18, 2018

(87) PCT Pub. No.: WO2017/183833
PCT Pub. Date: Oct. 26, 2017

(65) Prior Publication Data
US 2019/0112510 A1 Apr. 18, 2019

(30) Foreign Application Priority Data

Apr. 22, 2016 (KR) .................. 10-2016-0049096

(51) Int. Cl.
*C09J 115/00* (2006.01)
*C09J 123/22* (2006.01)
*G06F 3/041* (2006.01)

(52) U.S. Cl.
CPC ........... *C09J 115/00* (2013.01); *C09J 123/22* (2013.01); *G06F 3/041* (2013.01); *G06F 2203/04102* (2013.01)

(58) Field of Classification Search
CPC ...... C09J 115/00; C09J 123/22; C08F 210/12; C08F 2500/01; C08F 2500/02; C08L 9/00; C08L 47/00
See application file for complete search history.

(56) References Cited

U.S. PATENT DOCUMENTS

| | | | | |
|---|---|---|---|---|
| 2012/0128966 A1* | 5/2012 | Ma | ............ | C09J 7/29 428/317.3 |
| 2012/0141787 A1* | 6/2012 | Lee | ............ | C08F 8/42 428/355 EN |
| 2015/0299524 A1* | 10/2015 | Nishijima | ............ | C09J 123/22 428/41.3 |

FOREIGN PATENT DOCUMENTS

| | | |
|---|---|---|
| KR | 20110014692 A | 2/2011 |
| KR | 20130123245 A | 11/2013 |
| KR | 20140049278 A | 4/2014 |
| KR | 20140050956 A | 4/2014 |
| KR | 20150042993 A | 4/2015 |
| KR | 20150092186 A | 8/2015 |
| KR | 2016-0009126 * | 1/2016 |
| KR | 20160001732 A | 1/2016 |
| KR | 20160009126 A | 1/2016 |
| WO | 2012074733 A1 | 6/2012 |
| WO | 2015031246 A1 | 3/2015 |

OTHER PUBLICATIONS

Translation of KR 2016-0009126 (Year: 2016).*
Notice of Allowance in KR Application No. 10-2017-0043738 dated Sep. 18, 2019.
Search report from International Application No. PCT/KR2017/003706, dated Aug. 30, 2017.

* cited by examiner

*Primary Examiner* — Robert C Boyle
(74) *Attorney, Agent, or Firm* — Lerner, David, Littenberg, Krumholz & Mentlik, LLP

(57) ABSTRACT

Provided is an adhesive composition for an optical use, including: a first isobutylene-isoprene-based rubber having a weight average molecular weight (Mw) of 100,000 g/mol to 1,000,000 g/mol; and a second isobutylene-isoprene-based rubber having a weight average molecular weight (Mw) of 5,000 g/mol to 100,000 g/mol, in which the first isobutylene-isoprene-based rubber and the second isobutylene-isoprene-based rubber each include a hydroxy group. Further, provided is an adhesive layer including a thermally cured product of the adhesive composition for optical use.

15 Claims, No Drawings

ADHESIVE COMPOSITION FOR OPTICAL USE AND ADHESIVE LAYER FOR OPTICAL USE COMPRISING CURED PRODUCT THEREOF

CROSS-REFERENCE TO RELATED APPLICATION(S)

The present application is a national phase entry under 35 U.S.C. § 371 of International Application No. PCT/KR2017/003706, filed on Apr. 4, 2017, which claims priority to Korean Patent Application No. 10-2016-0049096 filed on Apr. 22, 2016, the disclosures of which are incorporated herein by reference.

TECHNICAL FIELD

The present specification relates to an adhesive composition for optical use and an adhesive layer for optical use including a cured product thereof.

BACKGROUND ART

Touch materials including packaged electronic devices or transparent conductive films, and the like need excellent touch sensitivity for an excellent operation. Furthermore, a lot of interests have been recently focused on the development of an adhesive composition for improving durability, flexibility and optical characteristics of a device such as a flexible touch screen panel.

In general, an adhesive agent used in a flexible touch screen panel, and the like needs to secure optical characteristics such as flexibility, transparency, and visibility. For this purpose, in the related art, an adhesive agent including an acrylic resin as a base resin has been generally used, but needs to be complemented in terms of touch sensitivity, and simultaneously, it is an important problem to secure a suitable storage modulus and optical characteristics.

In addition, adhesive agents using a rubber-based resin also have been developed in order to complement the disadvantages of the acrylic resins, and for example, the official gazette of Korean Patent Application Laid-Open No. 2014-0050956 discloses an adhesive composition including a rubber-based polymer, and the official gazette of Korean Patent Application Laid-Open No. 2014-0049278 also discloses that a butyl rubber-based polymer is used in order to lower a water vapor transmission rate.

However, an adhesive agent including a rubber-based resin as a base resin has problems in that it is difficult to achieve the chemical cross-linkage through a curing process, and a physical cross-linkage needs to be used, and as a result, it is difficult to form a curing or crosslinking structure for securing sufficient durability. Furthermore, the application of final products may be limited due to the problems.

DETAILED DESCRIPTION OF THE INVENTION

Technical Problem

The present specification has been made in an effort to provide an adhesive composition for optical use and an adhesive layer for optical use including a cured product thereof.

Technical Solution

An exemplary embodiment of the present invention provides an adhesive composition for optical use, including: a first isobutylene-isoprene-based rubber having a weight average molecular weight (Mw) of 100,000 g/mol to 1,000,000 g/mol; and a second isobutylene-isoprene-based rubber having a weight average molecular weight (Mw) of 5,000 g/mol to 100,000 g/mol, in which the first isobutylene-isoprene-based rubber and the second isobutylene-isoprene-based rubber each include a hydroxy group.

The first isobutylene-isoprene-based rubber and the second isobutylene-isoprene-based rubber may each have the hydroxy group introduced into an isoprene unit.

The first isobutylene-isoprene-based rubber and the second isobutylene-isoprene-based rubber may be each an acid-free type rubber.

A content of an isoprene unit of the first isobutylene-isoprene rubber may be 1 mol % or more and 30 mol % or less based on a total mole number of an isobutylene unit and an isoprene unit.

The first isobutylene-isoprene-based rubber may have a hydroxyl value (OH value) of 0.5 mgKOH/g to 10 mgKOH/g.

A content of an isoprene unit of the second isobutylene-isoprene rubber may be 1 mol % or more and 30 mol % or less based on a total mole number of an isobutylene unit and an isoprene unit.

The second isobutylene-isoprene-based rubber may have a hydroxyl value (OH value) of 0.5 mgKOH/g to 20 mgKOH/g.

A weight ratio of the first isobutylene-isoprene-based rubber and the second isobutylene-isoprene-based rubber may be 2:8 to 8:2.

The adhesive composition for optical use may further include one or more additives selected from the group consisting of a curing agent, a reaction accelerator, a curing retarder, and an adhesion promoter.

Another exemplary embodiment of the present invention provides an adhesive layer for optical use, having an adhesive layer including a cured product of the adhesive composition for optical use.

The adhesive layer for optical use may have a glass transition temperature (Tg) of −70° C. to −40° C.

The adhesive layer for optical use may have a storage modulus of 1.0 MPa to 5.0 MPa at −40° C., a storage modulus of 0.05 MPa to 0.20 MPa at 25° C., and a storage modulus of 0.01 MPa to 0.10 MPa at 60° C.

Advantageous Effects

Since an adhesive composition for optical use according to an exemplary embodiment of the present invention includes a rubber capable of being chemically crosslinked through an appropriate curing process, an adhesive layer for optical use, including a cured product of the adhesive composition for optical use may secure excellent long-term durability, water vapor transmission resistance, deformation resistance, and chemical resistance, and may implement excellent optical characteristics.

In the adhesive layer for optical use according to an exemplary embodiment of the present invention, rubber itself may be crosslinked and cured, and thus the adhesive layer for optical use may implement excellent durability and deformation resistance when applied to an electronic device, and may implement excellent optical characteristics, adhesive performance, and water vapor transmission resistance.

The adhesive layer for optical use according to an exemplary embodiment of the present invention may be utilized in various electronic devices as compared to an existing adhesive layer including an acrylic resin or a rubber-based resin as a base resin, and may implement excellent attaching properties and long-term reliability.

MODE FOR INVENTION

The benefits and features of the present invention, and the methods of achieving the benefits and features will become apparent with reference to Examples to be described below. However, the present invention is not limited to Examples to be disclosed below, but may be implemented in various other forms, and the present Examples are only provided for rendering the disclosure of the present invention complete and for fully representing the scope of the invention to a person with ordinary skill in the art to which the present invention pertains, and the present invention will be defined only by the scope of the claims.

An exemplary embodiment of the present invention provides an adhesive composition for optical use, including: a first isobutylene-isoprene-based rubber having a weight average molecular weight (Mw) of 100,000 g/mol to 1,000,000 g/mol; and a second isobutylene-isoprene-based rubber having a weight average molecular weight (Mw) of 5,000 g/mol to 100,000 g/mol, in which the first isobutylene-isoprene-based rubber and the second isobutylene-isoprene-based rubber each include a hydroxy group.

The adhesive composition for optical use is an adhesive composition used in an optical device, and may be used in, for example, a flexible touch screen panel, and the like to perform a sealing function of blocking moisture and oxygen introduced from the outside. As described above, the performance of blocking moisture and oxygen refers to a barrier performance. In general, for an adhesive agent for optical use, an acrylate-based resin is used as a base resin for optical characteristics instead of rubber, and a rubber-based resin may be more advantageous in terms of improving the barrier performance.

The rubber used in an adhesive agent in the related art was subjected to physical crosslinking through thermal curing or photocuring based on sulfur, or subjected to crosslinking by substituting the rubber itself with halogen. Alternatively, rubber was contained in an adhesive agent by a method of mixing a photocurable monomer with the rubber in the adhesive agent to cure the photocurable monomer by light irradiation.

In the case where sulfur or halogen components are used in an adhesive agent, a problem such as corrosion to an adherend may be caused when the adhesive agent is applied to a final electronic product, and as a result, the application range is narrow, and in the case where a photocurable monomer is used, there is a problem in that the durability is not good because the rubber itself does not participate in the curing.

In contrast, the adhesive composition for optical use according to the present invention may secure characteristics in that a chemically-modified rubber itself may be thermally cured by using the chemically-modified rubber, and may obtain a benefit of solving the above-described problem.

Specifically, the first isobutylene-isoprene-based rubber and the second isobutylene-isoprene-based rubber included in the adhesive composition for optical use are a chemically-modified rubber, and for example, the first isobutylene-isoprene-based rubber and the second isobutylene-isoprene-based rubber may each include a hydroxy group (—OH).

Since the adhesive composition for optical use need not use a sulfur or halogen component for curing by including the first isobutylene-isoprene-based rubber and the second isobutylene-isoprene-based rubber each including a hydroxy group, there is no danger of corrosion to an adherend, and as a result, excellent long-term durability and optical characteristics may be implemented.

The hydroxy group included in each of the first isobutylene-isoprene-based rubber and the second isobutylene-isoprene-based rubber is a functional group, serves to impart a crosslinking point of the rubber capable of being crosslinked by a crosslinking agent and polarity, and may impart adhesive strength and improve durability of a final adhesive film for optical use.

According to an exemplary embodiment of the present invention, the hydroxy group may be grafted to an isoprene unit of the first isobutylene-isoprene-based rubber and the second isobutylene-isoprene-based rubber. Specifically, the hydroxy group may be bonded to the main chains of the first and second isobutylene-isoprene rubbers. More specifically, the hydroxy group may be graft bonded to the isoprene unit in the main chains of the first and second isobutylene-isoprene rubbers. That is, the hydroxy group is introduced not into the isobutylene unit, but into the isoprene unit, and thus may minimize the degree of unsaturation of the first isobutylene-isoprene-based rubber and the second isobutylene-isoprene-based rubber components, and as a result, it is also possible to obtain a benefit of improving water vapor transmission resistance and viscoelastic characteristics, and simultaneously prevent a yellowing phenomenon.

Further, the hydroxy group is grafted to the isoprene unit, and thus may be uniformly distributed in a rubber chain, and as a result, an effective crosslinking can be achieved, so that excellent durability and stable physical properties can be implemented.

According to an exemplary embodiment of the present invention, the polar functional group is a hydroxy group, and the hydroxy group may be bonded to an isoprene unit in the form of isopropanol.

According to an exemplary embodiment of the present invention, the first isobutylene-isoprene-based rubber and the second isobutylene-isoprene-based rubber may be each an acid-free type rubber. That is, the first isobutylene-isoprene-based rubber and the second isobutylene-isoprene-based rubber does not contain an acid group such as a carboxyl group (—COOH).

The first isobutylene-isoprene-based rubber and the second isobutylene-isoprene-based rubber each include a hydroxy group, and simultaneously, do not include a carboxyl group (—COOH), thereby providing an excellent effect of preventing corrosion when applied to a final article and easily securing stable viscoelasticity and improved long-term durability.

As described above, the rubber adhesive composition for optical use includes the first isobutylene-isoprene-based rubber, and the first isobutylene-isoprene-based rubber may have a weight average molecular weight (Mw) of about 100,000 g/mol to about 1,000,000 g/mol. Specifically, according to an exemplary embodiment of the present invention, the first isobutylene-isoprene-based rubber may have a weight average molecular weight (Mw) of about 500,000 g/mol to about 1,000,000 g/mol or about 500,000 g/mol to about 700,000 g/mol.

The weight average molecular weight of the first isobutylene-isoprene-based rubber may maintain the range, so that it is possible to sufficiently secure a physical entanglement site caused by a crosslinking structure after the rubber adhesive composition for optical use is cured and to provide a matrix having excellent compatibility capable of providing sites in which organic and inorganic particles may be uniformly distributed. Further, an appropriate viscosity is secured by using a rubber having a weight average molecular weight (Mw) within the range as a base component, so that when the adhesive composition is prepared as an adhesive film or an adhesive sheet, excellent coatability may be exhibited without a problem such as dewetting, and furthermore, improved long-term durability and water vapor transmission resistance may be easily implemented.

When the weight average molecular weight of the first isobutylene-isoprene-based rubber is less than the range, durability and impact resistance may deteriorate, and a dewetting problem may occur when an adhesive film is formed. When the weight average molecular weight of the first isobutylene-isoprene-based rubber is more than the range, there may occur a problem in that it is difficult to form a film because it is difficult to uniformly distribute the first isobutylene-isoprene-based rubber.

According to an exemplary embodiment of the present invention, a content of an isoprene unit of the first isobutylene-isoprene rubber may be 1 mol % or more and 30 mol % or less based on a total mole number of an isobutylene unit and an isoprene unit. Further, the content of the isoprene unit may be 1% or more and 30% or less based on the total unit of the isobutylene-isoprene. The content of the isoprene unit may be the same as the content of an isoprene monomer based on the total copolymerization monomers when the first isobutylene-isoprene rubber is prepared.

When the content of isoprene of the first isobutylene-isoprene rubber is adjusted to 1 mol % or more based on the total mole number of an isobutylene unit and an isoprene unit, a hydroxy group may be easily introduced, and the rubber itself may be smoothly crosslinked through thermal curing. Furthermore, when the content of isoprene is adjusted to 30 mol % or less based on the total mole number of an isobutylene unit and an isoprene unit, the moisture permeability and gas permeability of the adhesive composition for optical use may be implemented at a low level, and as a result, it is possible to prevent corrosion of electronic devices to which the adhesive composition is applied and to minimize a yellowing phenomenon.

In the present specification, the isobutylene unit and the isoprene unit may mean an isobutylene repeating unit and an isoprene repeating unit in the isobutylene-isoprene rubber, respectively.

Specifically, the first isobutylene-isoprene-based rubber may be a copolymer formed from a monomer mixture including about 70 mol % to about 99 mol % of isobutylene and about 1 mol % to about 30 mol % of isoprene.

In the first isobutylene-isoprene rubber, when the content of isobutylene is less than about 70 mol % and the content of isoprene is more than about 30 mol %, the moisture permeability and gas permeability of the adhesive composition for optical use are increased, and as a result, there is a concern in that optical characteristics of electronic devices to which the adhesive composition is applied are hindered, and a yellowing phenomenon may occur. Further, when the content of isobutylene is more than about 99 mol % and the content of isoprene is less than about 1 mol %, it may be difficult to sufficiently introduce a hydroxy group into the first isobutylene-isoprene rubber, and there may occur a problem in that an effective crosslinking deteriorates.

According to an exemplary embodiment of the present invention, the first isobutylene-isoprene-based rubber may have a hydroxyl value (OH value) of about 0.5 mgKOH/g to about 10 mgKOH/g.

The hydroxyl value of the first isobutylene-isoprene-based rubber maintains the range, so that a sufficient crosslinking is achieved, and as a result, the durability may be improved, and excellent viscoelasticity and water vapor transmission resistance may be easily secured. When the content of the hydroxy group included in the first isobutylene-isoprene-based rubber is more than the range, an increase in glass transition temperature is caused, and as a result, there may occur a problem in that the flexibility may deteriorate. When the content of the hydroxy group included in the first isobutylene-isoprene-based rubber is less than the range, there may occur a problem in that an effective crosslinking deteriorates.

The rubber adhesive composition for optical use includes the first isobutylene-isoprene-based rubber and the second isobutylene-isoprene-based rubber, and the second isobutylene-isoprene-based rubber may have a weight average molecular weight (Mw) of about 5,000 g/mol to about 100,000 g/mol. Specifically, according to an exemplary embodiment of the present invention, the second isobutylene-isoprene-based rubber may have a weight average molecular weight (Mw) of about 30,000 g/mol to about 100,000 g/mol or about 50,000 g/mol to about 70,000 g/mol.

The weight average molecular weight of the second isobutylene-isoprene-based rubber maintains the range, so that the second isobutylene-isoprene-based rubber may serve as an adhesion promoter and a plasticizer of the rubber adhesive composition for optical use, and may provide excellent adhesive strength and improve the dispersibility of the adhesive composition for optical use. When the weight average molecular weight of the second isobutylene-isoprene-based rubber is less than the range, there may occur a problem in that the moldability deteriorates. When the weight average molecular weight of the second isobutylene-isoprene-based rubber is more than the range, there may occur a problem in that it is difficult to form a film because it is difficult to uniformly distribute the second isobutylene-isoprene-based rubber.

According to an exemplary embodiment of the present invention, a content of an isoprene unit of the second isobutylene-isoprene rubber may be 1 mol % or more and 30 mol % or less based on a total mole number of an isobutylene unit and an isoprene unit. Further, the content of the isoprene unit may be 1% or more and 30% or less based on the total unit of the second isobutylene-isoprene. The content of the isoprene unit may be the same as the content of an isoprene monomer based on the total copolymerization monomers when the second isobutylene-isoprene rubber is prepared.

When the content of isoprene of the second isobutylene-isoprene rubber is adjusted to 1 mol % or more based on the total mole number of an isobutylene unit and an isoprene unit, a hydroxy group may be easily introduced, and the rubber itself may be smoothly crosslinked through thermal curing. Furthermore, when the content of isoprene is adjusted to 30 mol % or less based on the total mole number of the isobutylene unit and the isoprene unit, there is an advantage in that the compatibility with the first isobutylene-isoprene rubber is excellent.

The second isobutylene-isoprene-based rubber may be a copolymer formed from a monomer mixture including about 70 mol % to about 99 mol % of isobutylene and about 1 mol % to about 30 mol % of isoprene.

In the second isobutylene-isoprene rubber, when the content of isobutylene is less than about 70 mol % and the content of isoprene is more than about 30 mol %, there may occur a problem in that the compatibility with the first isobutylene-isoprene-based rubber deteriorates. Further, when the content of isobutylene is more than about 99 mol % and the content of isoprene is less than about 1 mol %, there may occur a problem in that the crosslinking reaction deteriorates due to a decrease in sites capable of including a hydroxy group.

According to an exemplary embodiment of the present invention, the second isobutylene-isoprene-based rubber may have a hydroxyl value (OH value) of about 0.5 mgKOH/g to about 20 mgKOH/g.

The hydroxyl value of the second isobutylene-isoprene-based rubber maintains the range, so that improved adhesive strength and durability may be implemented, and a plasticizer effect may be easily secured. When the hydroxyl value of the second isobutylene-isoprene-based rubber is more than the range, there may occur a problem in that the compatibility with the first isobutylene-isoprene-based rubber deteriorates. When the content of the hydroxy group included in the second isobutylene-isoprene-based rubber is less than the range, there may occur a problem in that the crosslinking is not sufficiently achieved.

The hydroxy group is introduced while breaking the isoprene double bond of each of the first isobutylene-isoprene-based rubber and the second isobutylene-isoprene-based rubber. The more the hydroxy group is introduced, the smaller the number of double bonds included in the first isobutylene-isoprene-based rubber and the second isobutylene-isoprene-based rubber is, and the degree of unsaturation of the first isobutylene-isoprene-based rubber and the second isobutylene-isoprene-based rubber may be lowered.

According to an exemplary embodiment of the present invention, the degree of unsaturation of the first isobutylene-isoprene-based rubber including the hydroxy group may be about 0 to about 1, or about 0 to about 0.5, and the degree of unsaturation of the second isobutylene-isoprene-based rubber may be about 0 to about 1, or about 0 to about 0.5.

The 'degree of unsaturation' indicates a degree to which multiple bonds are included in a chemical structure, and may be measured by using NMR or IR, and specifically, means the number of multiple bonds in the chemical structure of each of the first isobutylene-isoprene-based rubber and the second isobutylene-isoprene-based rubber including the hydroxy group. Specifically, the degree of unsaturation may mean the number of units including multiple bonds based on the number of isoprene units. For example, when there are no multiple bonds in the repeating unit of the isobutylene-isoprene rubber having the hydroxy group, the degree of unsaturation may be 0. In addition, when the number of repeating units having multiple bonds is half the number of isoprene units of the isobutylene-isoprene rubber having the hydroxy group, the degree of unsaturation may be 0.5.

The adhesive composition for optical use may improve water vapor transmission resistance and viscoelastic characteristics by using the first isobutylene-isoprene-based rubber and the second isobutylene-isoprene-based rubber, which have a degree of unsaturation within the range, may implement excellent weatherability and durability by preventing a yellowing phenomenon, and may easily secure excellent optical properties and viscoelasticity.

The adhesive composition for optical use includes both the first isobutylene-isoprene-based rubber and the second isobutylene-isoprene-based rubber. Specifically, The adhesive composition for optical use may simultaneously implement excellent durability, impact resistance, deformation resistance, adhesive property, water vapor transmission resistance, optical characteristics, and the like by including both the first isobutylene-isoprene-based rubber having a relatively large weight average molecular weight and the second isobutylene-isoprene-based rubber having a relatively small weight average molecular weight, may implement an appropriate storage elastic modulus according to the temperature to prevent the deformation when applied to a final product and improve the reliability of an article, and may easily secure appropriate viscoelasticity and moldability.

According to an exemplary embodiment of the present invention, for the adhesive composition for optical use, a mass ratio of the first isobutylene-isoprene-based rubber and the second isobutylene-isoprene-based rubber may be about 2:8 to about 8:2. Specifically, according to an exemplary embodiment of the present invention, for the adhesive composition for optical use, a mass ratio of the first isobutylene-isoprene-based rubber and the second isobutylene-isoprene-based rubber may be about 3:7 to about 7:3.

The mass ratio of the first isobutylene-isoprene-based rubber to the second isobutylene-isoprene-based rubber maintains the range, so that excellent durability, impact resistance, water vapor transmission resistance, deformation resistance, and adhesive strength may be simultaneously implemented, and an effect of improving moldability and viscoelasticity may be implemented when a film is formed. In the case where the mass ratio of the first isobutylene-isoprene-based rubber to the second isobutylene-isoprene-based rubber is out of the range, when the adhesive composition is applied to a final product, deformation may occur, and there may occur a problem in that the moldability deteriorates.

The adhesive composition for optical use may further include one or more additives selected from the group consisting of a curing agent, a reaction accelerator, a curing retarder, and an adhesion promoter.

The curing agent is a compound capable of being chemically bonded to the hydroxy group of the first isobutylene-isoprene-based rubber and the second isobutylene-isoprene-based rubber, and the adhesive composition for optical use is cured by the curing agent, and thus may have an appropriate curing degree. For example, the curing agent may include an isocyanate-based curing agent, and in this case, the chemical reaction occurs well, and as a result, excellent curing efficiency may be obtained.

The content of the curing agent may be 0.5 part by weight or more and 5 parts by weight or less based on 100 parts by weight of the first isobutylene-isoprene-based rubber and the second isobutylene-isoprene-based rubber. When the content of the curing agent is adjusted within the range, the amount of uncured residual curing agent may be minimized and an effective curing may be performed, and excellent durability and reliability may be secured by the effective curing.

The reaction accelerator serves to accelerate a chemical reaction between the curing agent and a hydroxy group of the first isobutylene-isoprene-based rubber and the second isobutylene-isoprene-based rubber, and specifically, may include one selected from the group consisting of a tin catalyst, a bismuth catalyst, a mercury-based catalyst, an amine-based catalyst, and a combination thereof. When the kind of reaction accelerator is used, the crosslinking reaction between the curing agent and a hydroxy group of the rubber may rapidly proceed, and the curing efficiency of the adhesive composition for optical use may be improved.

The content of the reaction accelerator may be 0.01 part by weight or more and 2 parts by weight or less based on 100 parts by weight of the first isobutylene-isoprene-based rubber and the second isobutylene-isoprene-based rubber. When the content of the reaction accelerator is adjusted within the range, the amount of residual reaction accelerator may be minimized and a coating film may be easily formed by using the adhesive composition for optical use.

The curing retarder serves to suppress a reaction until a step prior to a film coating after a final adhesive composition is blended, and specifically, may include a ketone-based curing retarder. When the kind of curing retarder is used, the stability of the final adhesive composition may be maintained, and it is possible to obtain a benefit in that a pot-life until the step prior to the film coating is sufficiently secured.

The content of the curing retarder may be 0.5 part by weight or more and 5 parts by weight or less based on 100 parts by weight of the first isobutylene-isoprene-based rubber and the second isobutylene-isoprene-based rubber. When the content of the curing retarder is adjusted within the range, bubbles according to the residual curing retarder is prevented from being formed, thereby improving the reliability of the adhesive layer for optical use which is obtained by using the adhesive composition for optical use. Further, when the content of the curing retarder is adjusted within the range, it is possible to effectively prevent the reaction from occurring before a coating film is formed by using the adhesive composition for optical use.

The adhesive composition for optical use includes a rubber component, and thus may implement an excellent barrier performance due to the low water vapor transmission rate, but has an aspect in that it is difficult to secure sufficient peel strength and attaching strength. Accordingly, the adhesive composition for optical use may further include an adhesion promoter, if necessary.

For example, the adhesion promoter may include one selected from the group consisting of a hydrogenated dicyclopentadiene-based compound, a hydrogenated terpene-based compound, a hydrogenated rosin-based compound, a hydrogenated aromatic compound, a hydrogenated petroleum-based compound, and a combination thereof. The adhesion promoter includes a compound having a hydrogenated structure and thus may be advantageous in implementing transparency, and may implement excellent attaching strength and peel strength because the adhesion promoter is less affected by the thermal energy during the thermal curing.

For example, the adhesion promoter may include a hydrogenated dicyclopentadiene-based compound or a hydrogenated rosin-based compound, and in this case, it is possible to obtain an effect in that particularly, the tack performance is imparted and optical characteristics such as light transmittance and haze are improved.

The content of the adhesion promoter may be 0.01 part by weight or more and 10 parts by weight or less based on 100 parts by weight of the first isobutylene-isoprene-based rubber and the second isobutylene-isoprene-based rubber. By adding the adhesion promoter, it is possible to induce an increase in adhesive strength of an adhesive layer for optical use, which is obtained by using the adhesive composition for optical use, but an increase in glass transition temperature is accompanied, so that an increase in modulus at low temperature is caused, and as a result, the content of the adhesion promoter may be limited within the range.

Another exemplary embodiment of the present invention provides an adhesive layer for optical use, including a cured product of the adhesive composition for optical use.

Further, still another exemplary embodiment of the present invention provides an adhesive film for optical use, including the adhesive layer for optical use. The adhesive film for optical use may have a release film provided on at least one surface of the adhesive film for optical use. In addition, the adhesive film for optical use may further include a transparent substrate layer, and may have the adhesive layer for optical use provided on at least one surface of the substrate layer.

The adhesive layer for optical use is applied to an optical device such as a display, an electronic device, and an organic light emitting device (OLED), and may simultaneously implement excellent optical characteristics and barrier performance through an adhesive layer for optical use, including a cured product of the adhesive composition for optical use.

According to an exemplary embodiment of the present invention, the adhesive layer for optical use includes a cured product of the adhesive composition for optical use, and the cured product may be a thermally cured product prepared by adding thermal energy to the adhesive composition for optical use and curing the adhesive composition for optical use.

According to an exemplary embodiment of the present invention, the adhesive layer for optical use may have a glass transition temperature (Tg) of about −70° C. to about −40° C.

By adjusting the glass transition temperature of the adhesive layer for optical use within the range, it is possible to implement excellent flexibility, viscoelasticity, and processability, and it is possible to maximize dimensional stability when physically driving a flexible device to which the adhesive layer for optical use is applied.

Furthermore, since the adhesive layer for optical use uses an adhesive composition for optical use, including the first isobutylene-isoprene-based rubber and the second isobutylene-isoprene-based rubber, which include a hydroxy group, the adhesive layer for optical use may implement excellent flexibility because the glass transition temperature need not be excessively increased as compared to the case of including a carboxyl group, thereby maintaining improved durability, water vapor transmission resistance, deformation resistance, and optical characteristics.

According to an exemplary embodiment of the present invention, the adhesive layer for optical use may have a storage modulus of 1.0 MPa to 5.0 MPa at −40° C., a storage modulus of 0.05 MPa to 0.20 MPa at 25° C., and a storage modulus of 0.01 MPa to 0.10 MPa at 60° C.

The storage modulus of the adhesive layer for optical use maintains the range at each temperature, so that even though the adhesive layer for optical use is applied to a final product, there is a benefit in that the deformation is small and the dimensional stability is high, and excellent viscoelasticity and durability may be implemented. When the storage modulus of the adhesive layer for optical use is out of the range at each temperature, the adhesive layer for optical use is deformed according to the temperature, and as a result, the reliability of a product may deteriorate and durability may be weakened. In addition, when the adhesive film for optical use is applied to a final product, a permanent deformation occurs, and as a result, it may be difficult to implement flexible physical properties.

According to an exemplary embodiment of the present invention, the adhesive layer for optical use is prepared from the adhesive composition for optical use, and thus may exhibit characteristics in which the peel strength against a substrate is high and the water vapor transmission rate is low. For example, the adhesive layer for optical use may have a peel strength against a glass substrate of about 600 g/in or more and 900 g/in or less, or 1,000 g/in or more, specifically about 1,000 g/in to about 1,500 g/in, and more specifically about 1,200 g/in to about 1,300 g/in.

Simultaneously, the adhesive layer for optical use may have a water vapor transmission rate (WVTR) of about 10 g/m2·24 hr or less, for example, about 7 g/m2·24 hr or less, for example, about 6 g/m2·24 hr or less, and for example, more than about 1 g/m2·24 hr and less than about 5 g/m2·24 hr.

The adhesive layer for optical use may exhibit a peel strength and a water vapor transmission rate within the ranges through the adhesive composition for optical use, and as a result, the adhesive layer for optical use or an adhesive film for optical use, including the same is applied to a display or an electronic device, and thus may simultaneously exhibit excellent barrier performance and durability.

According to an exemplary embodiment of the present invention, the adhesive layer for optical use may have a light transmittance of about 90% or more, for example, about 92% or more.

According to an exemplary embodiment of the present invention, the adhesive layer for optical use may have a haze of less than about 1%, for example, less than about 0.8%.

When the adhesive layer satisfies a light transmittance and a haze within the ranges, the adhesive layer for optical use may be usefully applied to parts of displays or electronic devices, which require the visibility, and may improve visibility based on excellent optical characteristics.

The adhesive layer for optical use is formed from the adhesive composition for optical use, and it may be the most preferable that all of the storage modulus, the gel content, the peel strength against a glass substrate, the water vapor transmission rate, the light transmittance, and the haze simultaneously satisfy the above-described ranges. The most preferable adhesive layer for optical use may be implemented by controlling the mixture ratio of the first isobutylene-isoprene-based rubber and the second isobutylene-isoprene-based rubber included in the adhesive composition for optical use, the ratio of hydroxy group included, and the like.

Hereinafter, specific examples of the present invention will be suggested. However, the Examples described below are only provided for specifically exemplifying or explaining the present invention, and the present invention is not limited thereby.

PREPARATION EXAMPLES

Preparation Example 1: Preparation of First Isobutylene-Isoprene Rubber (IIR-OH IP 1.78 mol %)

An isobutylene-isoprene rubber being a copolymer formed from a monomer mixture including 1.78 mol % of isoprene and 98.22 mol % of isobutylene was prepared. 3 parts by weight of a peroxide (mCPBA) were put into 100 parts by weight of the isobutylene-isoprene rubber in a 630 L reactor in which a nitrogen gas was refluxed and a cooling device was installed so as to easily adjust the temperature, and then the resulting mixture was stirred at 30° C. for 6 hours. Subsequently, 3.1 parts by weight of an aqueous hydrochloric acid solution having a concentration of 1 N was put into 100 parts by weight of the rubber, the resulting mixture was stirred at 30° C. for 1 hour, and then the temperature was increased to 90° C., and the mixture was stirred for 1 hour. By the process, a first isobutylene-isoprene rubber (IIR-OH) having a hydroxy group grafted to an isoprene unit of the main chain and having a hydroxyl value of 0.65 and a weight average molecular weight (Mw) of 580,000 g/mol was prepared.

Preparation Example 2: Preparation of Second Isobutylene-Isoprene Rubber (Kalene-OH)

An isobutylene-isoprene rubber being a copolymer formed from a monomer mixture including 2.56 mol % of isoprene and 97.44 mol % of isobutylene was prepared. 3 parts by weight of a peroxide (mCPBA) were put into 100 parts by weight of the isobutylene-isoprene rubber in a 630 L reactor in which a nitrogen gas was refluxed and a cooling device was installed so as to easily adjust the temperature, and then the resulting mixture was stirred at 30° C. for 6 hours. Subsequently, 3.1 parts by weight of an aqueous hydrochloric acid solution having a concentration of 1 N was put into 100 parts by weight of the rubber, the resulting mixture was stirred at 30° C. for 1 hour, and then the temperature was increased to 90° C., and the mixture was stirred for 1 hour. By the process, a second isobutylene-isoprene rubber (Kalene-OH) having a hydroxy group grafted to an isoprene unit of the main chain and having a hydroxyl value of 4.67 and a weight average molecular weight (Mw) of 60,000 g/mol was prepared.

Preparation Example 3: Preparation of High-Molecular Weight Isobutylene-Isoprene Rubber Having Carboxyl Group (IIR-COOH)

An isobutylene-isoprene rubber being a copolymer formed from a monomer mixture including 1.78 mol % of isoprene and 98.22 mol % of isobutylene was prepared. 3 parts by weight of maleic anhydride and 1.75 parts by weight of dibenzoyl peroxide were put into 100 parts by weight of the isobutylene-isoprene rubber in a 630 L reactor in which a nitrogen gas was refluxed and a cooling device was installed so as to easily adjust the temperature, and then the resulting mixture was stirred at 60° C. to 80° C. for 5 hours. Subsequently, 3.1 parts by weight of an aqueous hydrochloric acid solution having a concentration of 1 N was put into 100 parts by weight of the rubber, the resulting mixture was stirred at 30° C. for 1 hour, and then the temperature was increased to 90° C., and the mixture was stirred for 1 hour. By the process, a high-molecular weight isobutylene-isoprene rubber (IIR-COOH) including a carboxyl group grafted to an isoprene unit of the main chain and having a weight average molecular weight (Mw) of 260,000 g/mol was prepared.

Preparation Example 4: Preparation of First Isobutylene-Isoprene Rubber (IIR-OH IP 0.5 mol %)

A first isobutylene-isoprene rubber (IIR-OH) having a hydroxy group grafted to an isoprene unit of the main chain and having a hydroxyl value of 0.18 and a weight average molecular weight (Mw) of 580,000 g/mol was prepared in the same manner as in Preparation Example 1, except that an isobutylene-isoprene rubber being a copolymer formed from a monomer mixture including 0.5 mol % of isoprene and 99.5 mol % of isobutylene was used.

Preparation Example 5: Preparation of First Isobutylene-Isoprene Rubber (IIR-OH IP 35 mol %)

A first isobutylene-isoprene rubber (IIR-OH) having a hydroxy group grafted to an isoprene unit of the main chain and having a hydroxyl value of 12.78 and a weight average molecular weight (Mw) of 580,000 g/mol was prepared in the same manner as in Preparation Example 1, except that an isobutylene-isoprene rubber being a copolymer formed from a monomer mixture including 35 mol % of isoprene and 65 mol % of isobutylene was used.

Examples and Comparative Examples

Example 1

The first isobutylene-isoprene rubber in Preparation Example 1 and the second isobutylene-isoprene rubber in Preparation Example 2 were mixed at a weight ratio of 3:7, and 1.0 part by weight of an isocyanate-based curing agent (manufactured by Evonik Co., Ltd., VESTANAT TMDI), 1.0 part by weight of an isocyanate-based curing agent (manufactured by Asahi Kasei Co., Ltd., Duranate™ TKA-100), 1.0 part by weight of a tin catalyst as a reaction accelerator, and 1.0 part by weight of acetylacetone (manufactured by Sigma-Aldrich Co., Ltd.) as a curing retarder were mixed based on the total content 100 parts by weight of the first isobutylene-isoprene rubber and the second isobutylene-isoprene rubber, thereby preparing an adhesive composition.

Example 2

The first isobutylene-isoprene rubber in Preparation Example 1 and the second isobutylene-isoprene rubber in Preparation Example 2 were mixed at a weight ratio of 4:6, and 2.0 parts by weight of an isocyanate-based curing agent (manufactured by Evonik Co., Ltd., VESTANAT TMDI), 1.0 part by weight of an isocyanate-based curing agent (manufactured by Ashai Kasei Co., Ltd., Duranate™ TKA-100), 1.0 part by weight of a tin catalyst as a reaction accelerator, and 1.0 part by weight of acetylacetone (manufactured by Sigma-Aldrich Co., Ltd.) as a curing retarder were mixed based on 100 parts by weight of the first isobutylene-isoprene rubber and the second isobutylene-isoprene rubber, thereby preparing an adhesive composition.

Example 3

The first isobutylene-isoprene rubber in Preparation Example 1 and the second isobutylene-isoprene rubber in Preparation Example 2 were mixed at a weight ratio of 4:6, and 2.0 parts by weight of an isocyanate-based curing agent (manufactured by Evonik Co., Ltd., VESTANAT TMDI), 1.0 part by weight of an isocyanate-based curing agent (manufactured by Ashai Kasei Co., Ltd., Duranate™ TKA-100), 1.0 part by weight of a tin catalyst as a reaction accelerator, 1.0 part by weight of acetylacetone (manufactured by Sigma-Aldrich Co., Ltd.) as a curing retarder, and 5 parts by weight of a hydrogenated terpene-based compound (manufactured by Yasuhara Chemical Co., Ltd., Clearon P125) as an adhesion promoter were mixed based on 100 parts by weight of the first isobutylene-isoprene rubber and the second isobutylene-isoprene rubber, thereby preparing an adhesive composition.

Example 4

The first isobutylene-isoprene rubber in Preparation Example 1 and the second isobutylene-isoprene rubber in Preparation Example 2 were mixed at a weight ratio of 5:5, and 1.0 part by weight of an isocyanate-based curing agent (manufactured by Evonik Co., Ltd., VESTANAT TMDI), 1.0 part by weight of an isocyanate-based curing agent (manufactured by Ashai Kasei Co., Ltd., Duranate™ TKA-100), 1.0 part by weight of a tin catalyst as a reaction accelerator, and 1.0 part by weight of acetylacetone (manufactured by Sigma-Aldrich Co., Ltd.) as a curing retarder were mixed based on the total content 100 parts by weight of the first isobutylene-isoprene rubber and the second isobutylene-isoprene rubber, thereby preparing an adhesive composition.

Example 5

The first isobutylene-isoprene rubber in Preparation Example 1 and the second isobutylene-isoprene rubber in Preparation Example 2 were mixed at a weight ratio of 6:4, and 1.0 part by weight of an isocyanate-based curing agent (manufactured by Evonik Co., Ltd., VESTANAT TMDI), 1.0 part by weight of an isocyanate-based curing agent (manufactured by Ashai Kasei Co., Ltd., Duranate™ TKA-100), 1.0 part by weight of a tin catalyst as a reaction accelerator, and 1.0 part by weight of acetylacetone (manufactured by Sigma-Aldrich Co., Ltd.) as a curing retarder were mixed based on the total content 100 parts by weight of the first isobutylene-isoprene rubber and the second isobutylene-isoprene rubber, thereby preparing an adhesive composition.

Example 6

The first isobutylene-isoprene rubber in Preparation Example 1 and the second isobutylene-isoprene rubber in Preparation Example 2 were mixed at a weight ratio of 7:3, and 1.0 part by weight of an isocyanate-based curing agent (manufactured by Evonik Co., Ltd., VESTANAT TMDI), 1.0 part by weight of an isocyanate-based curing agent (manufactured by Ashai Kasei Co., Ltd., Duranate™ TKA-100), 1.0 part by weight of a tin catalyst as a reaction accelerator, and 1.0 part by weight of acetylacetone (manufactured by Sigma-Aldrich Co., Ltd.) as a curing retarder were mixed based on the total content 100 parts by weight of the first isobutylene-isoprene-based rubber and the second isobutylene-isoprene-based rubber, thereby preparing an adhesive composition.

Comparative Example 1

An adhesive composition including the first isobutylene-isoprene rubber in Preparation Example 1 and including 10 parts by weight of dicyclopentadiene diacrylate based on 100 parts by weight of the first isobutylene-isoprene rubber was prepared.

Comparative Example 2

An adhesive composition including the second isobutylene-isoprene rubber in Preparation Example 2 and including 10 parts by weight of dicyclopentadiene diacrylate based on 100 parts by weight of the second isobutylene-isoprene rubber was prepared.

Comparative Example 3

An isobutylene-isoprene rubber (Butyl 268; ExxonMobil Chemical) without a hydroxyl group as a first isobutylene-isoprene rubber and an isobutylene-isoprene rubber (manufactured by Royal Elastomers, Kalene 800) without a hydroxyl group as a second isobutylene-isoprene rubber were mixed at a weight ratio of 4:6, and 1.0 part by weight of an isocyanate-based curing agent (manufactured by Evonik Co., Ltd., VESTANAT TMDI), 1.0 part by weight of an isocyanate-based curing agent (manufactured by Ashai Kasei Co., Ltd., Duranate™ TKA-100), 1.0 part by weight of a tin catalyst as a reaction accelerator, and 1.0 part by weight of acetylacetone (manufactured by Sigma-Aldrich Co., Ltd.) as a curing retarder were mixed based on the total content 100 parts by weight of the first isobutylene-isoprene rubber and the second isobutylene-isoprene rubber, thereby preparing an adhesive composition.

Comparative Example 4

An adhesive composition was prepared by including the high-molecular weight isobutylene-isoprene rubber having a carboxyl group in Preparation Example 3 and mixing 1.0 part by weight of an aziridine curing agent (manufactured by Geowon Technology, GW-752) based on 100 parts by weight of the high-molecular weight isobutylene-isoprene rubber having a carboxyl group.

Comparative Example 5

An adhesive composition including an acrylic resin (manufactured by LG Hausys, Ltd.) and 0.5 part by weight of a photoinitiator based on 100 parts by weight of the acrylic resin was prepared.

Reference Example 1

The first isobutylene-isoprene rubber in Preparation Example 4 and the second isobutylene-isoprene rubber in Preparation Example 2 were mixed at a weight ratio of 4:6, and 1.0 part by weight of an isocyanate-based curing agent (manufactured by Evonik Co., Ltd., VESTANAT TMDI), 1.0 part by weight of an isocyanate-based curing agent (manufactured by Ashai Kasei Co., Ltd., Duranate™ TKA-100), 1.0 part by weight of a tin catalyst as a reaction accelerator, and 1.0 part by weight of acetylacetone (manufactured by Sigma-Aldrich Co., Ltd.) as a curing retarder were mixed based on the total content 100 parts by weight of the first isobutylene-isoprene rubber and the second isobutylene-isoprene rubber, thereby preparing an adhesive composition.

Reference Example 2

The first isobutylene-isoprene rubber in Preparation Example 5 and the second isobutylene-isoprene rubber in Preparation Example 2 were mixed at a weight ratio of 4:6, and 1.0 part by weight of an isocyanate-based curing agent (manufactured by Evonik Co., Ltd., VESTANAT TMDI), 1.0 part by weight of an isocyanate-based curing agent (manufactured by Ashai Kasei Co., Ltd., Duranate™ TKA-100), 1.0 part by weight of a tin catalyst as a reaction accelerator, and 1.0 part by weight of acetylacetone (manufactured by Sigma-Aldrich Co., Ltd.) as a curing retarder were mixed based on the total content 100 parts by weight of the first isobutylene-isoprene rubber and the second isobutylene-isoprene rubber, thereby preparing an adhesive composition.

TABLE 1

| | First isobutylene-isoprene rubber:Second isobutylene-isoprene rubber [Weight ratio] | Adhesion promoter [Weight ratio] |
|---|---|---|
| Example 1 | 3:7 (IIR-OH IP 1.78 mol %:Kalene-OH) | 0 |
| Example 2 | 4:6 (IIR-OH IP 1.78 mol %:Kalene-OH) | 0 |
| Example 3 | 4:6 (IIR-OH IP 1.78 mol %:Kalene-OH) | 5 |
| Example 4 | 5:5 (IIR-OH IP 1.78 mol %:Kalene-OH) | 0 |
| Example 5 | 6:4 (IIR-OH IP 1.78 mol %:Kalene-OH) | 0 |
| Example 6 | 7:3 (IIR-OH IP 1.78 mol %:Kalene-OH) | 0 |
| Comparative Example 1 | 10:0 (IIR-OH IP 1.78 mol %:Kalene-OH) | 0 |
| Comparative Example 2 | 0:10 (IIR-OH IP 1.78 mol %:Kalene-OH) | 0 |
| Comparative Example 3 | 4:6 (Butyl 268:Kalene 800) | 0 |
| Comparative Example 4 | Only IIR-COOH is present | 0 |
| Comparative Example 5 | Acrylic resin | 0 |
| Reference Example 1 | 4:6 (IIR-OH IP 0.5 mol %:Kalene-OH) | 0 |
| Reference Example 2 | 4:6 (IIR-OH IP 35 mol %:Kalene-OH) | 0 |

<Evaluation>

Each of the adhesive compositions in Examples 1 to 6, the adhesive compositions in Comparative Examples 1 to 5, and the adhesive compositions in Reference Examples 1 and 2 were applied in the form of a film, a thermally cured product was formed at a temperature of 120° C. while drying each of the adhesive compositions, and an adhesive layer having a thickness of 50 μm and including the thermally cured product was prepared.

In the case of Comparative Example 5, a photocured product was formed by irradiating UV light energy of 2,500 mJ/cm2 thereon, and an adhesive layer having a thickness of 50 μm and including the photocured product was prepared.

Experimental Example 1: Measurement of Water Vapor Transmission Rate

For each of the adhesive layers in the Examples, the Comparative Examples, and the Reference Examples, a water vapor transmission rate (WVTR) was measured with a measuring apparatus (Labthink TSY-T3) by adding a predetermined amount of water into a cup under conditions of a temperature of 38° C. and a relative humidity of 90%, loading the adhesive layer thereon, capping the cup, and then using a reduced weight of water evaporated for 24 hours, and the results are shown in the following Table 2.

Experimental Example 2: Measurement of Peel Strength

For each of the adhesive layers in the Examples, the Comparative Examples, and the Reference Examples, peel strength against a glass substrate was measured at a peel rate of 300 mm/min by using a universal testing machine (UTM), and the results are as shown in the following Table 2.

Experimental Example 3: Measurement of Optical Characteristics

1) Measurement (%) of Light Transmittance (T)

Each of the adhesive layers in the Examples, the Comparative Examples, and the Reference Examples was attached to a transparent glass substrate, and then a light transmittance was measured by using a UV-Vis spectrometer under a room temperature condition of 20° C. to 30° C., and the results are as shown in the following Table 2.

2) Measurement (%) of Haze (H)

Each of the adhesive layers in the Examples, the Comparative Examples, and the Reference Examples was attached to a transparent glass substrate, and then a haze was measured by means of a haze meter (manufactured by BYK Co., Ltd.) under a room temperature condition of 20° C. to 30° C., and the results are as shown in the following Table 2.

Experimental Example 4: Measurement of Durability

For each of the adhesive layers in the Examples, the Comparative Examples, and the Reference Examples, a structure of a barrier COP film/an adhesive layer/a glass substrate was formed, the structure was left to stand for 500 hours under conditions of a temperature of 85° C. and a relative humidity of 85%, the degree to which bubbles occurred was observed to evaluate the durability according to the occurrence of bubbles and the presence and absence of yellowing and lifting on the substrate, and the results are as shown in the following Table 2. The case where no bubbles occurred, no yellowing phenomenon occurred, and no lifting phenomenon occurred was indicated as excellent (O) in Table 2, and the case where any one among them was not satisfied was indicated as insufficient (X) in Table 2.

Experimental Example 5: Measurement of Storage Elastic Modulus (G)

For each of the adhesive layers in the Examples, the Comparative Examples, and the Reference Examples, the dynamic viscoelasticity was measured (frequency 1 Hz, warming rate 2° C./min) in accordance with JIS K7244-4, and the storage elastic modulus G' on the shear mode was calculated at −40° C., 25° C., and 60° C. and shown in Table 2.

TABLE 2

|  | Storage elastic modulus (MPa) | | | Durability | Water vapor transmission rate (g/m2 · 24 hr) | Peel strength (g/in) | Optical characteristics (%) | |
| --- | --- | --- | --- | --- | --- | --- | --- | --- |
|  | −40° C. | 25° C. | 60° C. |  |  |  | Transmittance | Haze |
| Example 1 | 1.789 | 0.085 | 0.056 | O | 4.7 | 1280 | 92.4 | 0.65 |
| Example 2 | 1.874 | 0.084 | 0.045 | O | 4.3 | 1200 | 92.4 | 0.68 |
| Example 3 | 2.624 | 0.084 | 0.040 | O | 4.4 | 1300 | 92.6 | 0.58 |
| Example 4 | 2.845 | 0.096 | 0.044 | O | 4.4 | 1050 | 92.5 | 0.66 |
| Example 5 | 3.262 | 0.144 | 0.080 | O | 4.2 | 940 | 92.5 | 0.67 |
| Example 6 | 3.844 | 0.160 | 0.10 | O | 4.2 | 600 | 92.3 | 0.80 |
| Comparative Example 1 | 8.505 | 0.230 | 0.165 | O | 4.7 | 400 | 92.5 | 0.62 |
| Comparative Example 2 | 10.150 | 0.182 | 0.012 | X | 5.2 | 1400 | 92.5 | 0.75 |
| Comparative Example 3 | 0.930 | 0.022 | 0.010 | X | 15.2 | 1800 | 92.2 | 0.84 |
| Comparative Example 4 | 9.268 | 0.102 | 0.009 | X | 7.6 | 2100 | 92.3 | 1.90 |
| Comparative Example 5 | 29.600 | 0.039 | 0.028 | O | 180 | 1600 | 92.8 | 0.23 |
| Reference Example 1 | 7.025 | 0.210 | 0.115 | X | 5.6 | 500 | 91.7 | 1.14 |
| Reference Example 2 | 10.520 | 0.932 | 0.224 | O | 3.8 | 1100 | 92.2 | 0.73 |

It can be confirmed that the adhesive films for optical use prepared in Examples 1 to 6 may reduce the deformation according to the process and use and maximize the durability and dimensional stability by maintaining the storage elastic modulus values of 1.0 MPa to 5.0 MPa at −40° C., 0.05 MPa to 0.20 MPa at 25° C., and 0.01 MPa to 0.10 MPa at 60° C. In addition, it can be confirmed that the adhesive films have a transmittance of 92% or more, a haze value of 0.8% or less, a glass peel strength of 600 W/in or more, and a water vapor transmission rate of 5 g/m2·24 hr, and are optimized for an adhesive film for optical use, which is applied to a flexible device.

In contrast, in the case of Comparative Examples 1 to 5, the storage elastic modulus values according to the temperature were significantly different from those of the Examples, so that it could be expected that there would be a subsequent deformation and difficulty in processes.

Specifically, in Comparative Example 1, the storage elastic modulus value is extremely high and the glass peel strength value is extremely low, so that there is a problem in that deformation is highly likely to occur, and the adhesive film may be easily peeled off when being applied to a final product. In Comparative Example 2, the storage elastic modulus value is extremely high and the durability is low, so that the impact resistance and durability of a final product may be weakened, and the dimensional stability may deteriorate. In Comparative Example 3, the durability is low and the water vapor transmission rate is extremely high, so that the dimensional stability may deteriorate. In Comparative Examples 4 and 5, the storage elastic modulus and water vapor transmission rate are extremely high, so that optical characteristics may be poor, and the dimensional stability may deteriorate.

Furthermore, Reference Example 1 is a case where the content of isoprene of the first isobutylene-isoprene rubber is less than 1 mol %, and referring to the result in Table 2, it can be seen that the storage elastic modulus value according to the temperature is significantly different from those of the Examples, and the durability, peel strength, and optical characteristics are inferior to those of the Examples.

Further, Comparative Example 2 is a case where the content of isoprene of the first isobutylene-isoprene rubber is more than 30 mol %, and referring to the results in Table 2, the storage elastic modulus value according to the temperature is significantly different from those of the Examples, so that there is a problem in that the deformation according to the process and use may occur.

The invention claimed is:

1. An adhesive composition for optical use, comprising:
   a first isobutylene-isoprene-based rubber having a weight average molecular weight (Mw) of 100,000 g/mol to 1,000,000 g/mol; and
   a second isobutylene-isoprene-based rubber having a weight average molecular weight (Mw) of 5,000 g/mol to 100,000 g/mol,
   wherein each of the first isobutylene-isoprene-based rubber and the second isobutylene-isoprene-based rubber comprise a hydroxy group.

2. The adhesive composition of claim 1, wherein an isoprene unit of each of the first isobutylene-isoprene-based rubber and the second isobutylene-isoprene-based rubber includes the hydroxy group.

3. The adhesive composition of claim 1, wherein each of the first isobutylene-isoprene-based rubber and the second isobutylene-isoprene-based rubber do not contain an acid group.

4. The adhesive composition of claim 1, wherein a molar amount of an isoprene unit in the first isobutylene-isoprene rubber is 1 mol % or more and 30 mol % or less based on a total molar amount of an isobutylene unit and the isoprene unit in the first isobutylene-isoprene rubber.

5. The adhesive composition of claim 1, wherein the first isobutylene-isoprene-based rubber has a hydroxyl value (OH value) of 0.5 mgKOH/g to 10 mgKOH/g.

6. The adhesive composition of claim 1, wherein a molar amount of an isoprene unit of in the second isobutylene-isoprene rubber is 1 mol % or more and 30 mol % or less based on a total mole number molar amount of an isobutylene unit and an isoprene unit in the second isobutylene-isoprene rubber.

7. The adhesive composition of claim 1, wherein the second isobutylene-isoprene-based rubber has a hydroxyl value (OH value) of 0.5 mgKOH/g to 20 mgKOH/g.

8. The adhesive composition of claim 1, wherein a weight ratio of the first isobutylene-isoprene-based rubber and to the second isobutylene-isoprene-based rubber is 2:8 to 8:2.

9. The adhesive composition of claim 1, further comprising:
   one or more additives selected from the group consisting of a curing agent, a reaction accelerator, a curing retarder, and an adhesion promoter.

10. An adhesive layer for optical use, comprising:
    a cured product of the adhesive composition for of claim 1.

11. The adhesive layer of claim 10, wherein the adhesive layer for optical use has a glass transition temperature (Tg) of −70° C. to −40° C.

12. The adhesive layer of claim 10, wherein the adhesive layer for optical use has a storage modulus of 1.0 MPa to 5.0 MPa at −40° C., a storage modulus of 0.05 MPa to 0.20 MPa at 25° C., and a storage modulus of 0.01 MPa to 0.10 MPa at 60° C.

13. The adhesive composition of claim 1, wherein the first isobutylene-isoprene-based rubber has a Mw of 500,000 g/mol to 1,000,000 g/mol.

14. The adhesive composition of claim 1, wherein the second isobutylene-isoprene-based rubber has a Mw of 5,000 g/mol to 70,000 g/mol.

15. The adhesive composition of claim 1, wherein a molar amount of isoprene units in the second isobutylene-isoprene-based rubber is greater than a molar amount of isoprene units in the first isobutylene-isoprene-based rubber.

* * * * *